W. C. WOOD.
TIRE PATCH.
APPLICATION FILED FEB. 6, 1919.

1,348,466.

Patented Aug. 3, 1920.

UNITED STATES PATENT OFFICE.

WINFIELD C. WOOD, OF MINNEAPOLIS, MINNESOTA.

TIRE-PATCH.

1,348,466.	Specification of Letters Patent.	Patented Aug. 3, 1920.

Application filed February 6, 1919. Serial No. 275,364.

*To all whom it may concern:*

Be it known that I, WINFIELD C. WOOD, a citizen of the United States, and residing at Minneapolis, Hennepin county, State of Minnesota, have invented certain new and useful Improvements in Tire-Patches, of which the following is a specification.

The present invention relates to tire patches and more particularly to improvements in the type of patch described in the British patent to Lacey *et al.* No. 6,866 of 1910. This patent discloses a patch comprising a layer of fabric extensible in one direction only, a layer of vulcanized rubber on one side of the fabric, and a layer of unvulcanized or adhesive rubber on the other. In using the patch, it is applied to the tire tube so that it is inextensible in the direction transversely of the cut or opening in the tube but is extensible in the direction of the length of the cut. As explained in the patent, with many types of patches it is found that the stretch of the patch allows the cut in the tube to gap or open up with the result that the cut increases in length and soon extends outside of the patch. This difficulty is eliminated with the one-way inextensible patch of the type described herein.

In practice it is found that a patch constructed in accordance with the disclosure in the patent is not satisfactory for several reasons.

First: The patch is not air tight. The unvulcanized or raw rubber secured to one side of the fabric is more or less porous and air penetrates through this layer in spots acting to separate the raw rubber from the fabric.

Second: The raw rubber must be a very thin layer. If it is too thick, after the patch is applied, the raw rubber softens permitting the displacement of the patch relative to the cut. On the other hand, if the layer of raw rubber is sufficiently thin, it does not present a smooth surface to engage the tube surface because the thin layer does not fill in the interstices between the threads of the fabric.

It is the principal object of the present invention to provide a patch of the type mentioned which is not subject to the defects aforesaid. To this end, according to this invention, the patch, which is preferably made in large sheets, comprises a layer of fabric or similar material, extensible in one direction only, embedded in a layer of vulcanized rubber, and a thin layer of raw or unvulcanized rubber, or an adhesive, secured to one face of the vulcanized rubber.

Other objects and features of novelty will be apparent from the description taken in connection with the drawings in which:—

Figure 1:
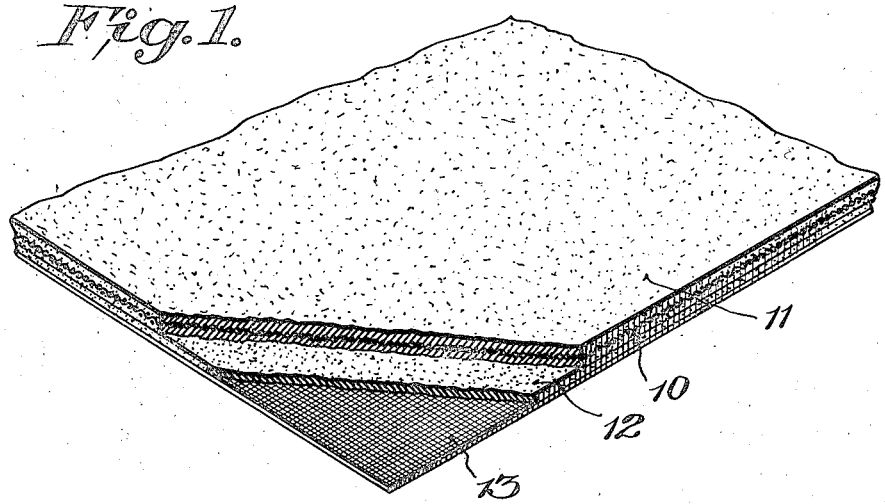
Figure 2:
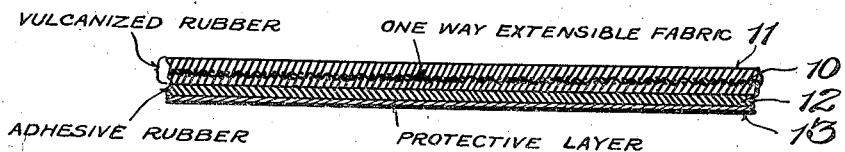

Figure 1 is a perspective view of a portion of a sheet of tire patch material constructed in accordance with the present invention, the thickness of the patch being greatly enlarged; and Fig. 2 is a cross section through the patch material.

Referring to the drawings the numeral 10 indicates a sheet of fabric which is inextensible in one direction and is extensible in another direction, preferably at right angles to the first or inextensible direction. Any fabric which has the above mentioned properties may be used, for example, knit fabrics such as those used for underwear and stockings.

The layer 10 of fabric is embedded in a layer 11 of vulcanized rubber. This may be accomplished in any suitable manner. If desired, the sheet of fabric may be frictioned with rubber on one side in the manner well known in tire manufacture and then frictioned in a similar manner on the other side, the result being that the fabric is then embedded in a layer of rubber. This layer of rubber with its embedded sheet of fabric may then be vulcanized.

A thin layer of raw or unvulcanized rubber 12 is now secured to one face of the rubber layer 11 throughout its area. The rubber of this layer 12 may be vulcanizable so that the heat generated when the tire is used acts to vulcanize the patch to the tube, but the invention is not limited to the use of a rubber having this property. The only requirement is that the layer 12 be of adhesive rubber. In order to protect the outer surface of the layer 12 a thin layer of glazed fabric 13 detachably covers the same.

In using the patch described herein, the surfaces of the tube surrounding the cut or opening therein first are cleaned with gasolene. Then, if desired, a rubber cement may be applied around the edges of the opening, although this is not absolutely necessary. A piece of the patch material is then cut from the sheet of such size that it will properly cover the opening in the tube and have its inextensible direction arranged across or transversely of the cut. The protective layer 13 is then stripped off and the piece of patch material applied over the cut with its inextensible direction across the same. It will be observed, as the layer of raw rubber 12 is secured directly to a layer of vulcanized rubber 10, this layer 12 may be made as thin as desired without any danger of the exposed face of the layer 12 being rough because of the fabric. Consequently, the adhesive face of the patch is absolutely smooth and its entire surface may contact with the tube surface. Furthermore, the layer 11 of vulcanized rubber being in contact throughout its surface with the layer 12 the vulcanized rubber reinforces the latter against any leakage. In other words, the layer 11 acts to prevent any leakage through the patch, while the layer 12 functions as an adhesive. Fabric disposed in the particular manner already described reinforces the patch and further acts to absolutely prevent the opening or gapping of the cut of the tube, while its extensible-in-one-direction feature permits the patch to stretch with the tube in the direction of the length of the cut.

Although a patch constructed in accordance with the present invention has been described in detail, it is to be understood that the invention comprehends changes and modifications which come within the scope of the appended claim.

Having thus described the invention what is claimed as new and desired to be secured by Letters Patent is:—

A sheet of tire patch material comprising a layer of vulcanized rubber having a layer of one-way-extensible fabric embedded therein, said fabric being co-extensive with the layer of rubber, a thin layer of adhesive rubber secured to the vulcanized layer throughout the area of one of its faces, and a detachable sheet of protective material covering the exposed face of said adhesive layer.

In testimony whereof I affix my signature.

WINFIELD C. WOOD.